(12) United States Patent
Nakajima et al.

(10) Patent No.: US 8,286,475 B2
(45) Date of Patent: Oct. 16, 2012

(54) TRANSDUCER ASSEMBLIES FOR DOWNHOLE TOOLS

(75) Inventors: Hiroshi Nakajima, Sagamihara (JP); Toshihiro Kinoshita, Sagamihara (JP); Takeo Fujihara, Machida (JP); Yasuo Kanaya, Machida (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 588 days.

(21) Appl. No.: 12/494,267

(22) Filed: Jun. 30, 2009

(65) Prior Publication Data

US 2010/0000311 A1 Jan. 7, 2010

Related U.S. Application Data

(60) Provisional application No. 61/078,345, filed on Jul. 4, 2008.

(51) Int. Cl.
*E21B 47/06* (2006.01)
(52) U.S. Cl. ..................................... 73/152.51
(58) Field of Classification Search ............... 73/152.47, 73/152.41
See application file for complete search history.

(56) References Cited

U.S. PATENT DOCUMENTS

| | | | |
|---|---|---|---|
| 2,770,741 A * | 11/1956 | Vore et al. ...................... | 310/338 |
| 2,831,177 A * | 4/1958 | Palmer ........................... | 367/172 |
| 3,020,504 A * | 2/1962 | Marks ............................. | 338/40 |
| 3,213,415 A * | 10/1965 | Baker et al. .................... | 181/106 |
| 3,385,369 A * | 5/1968 | Saurenman .................... | 166/319 |
| 3,390,737 A | 7/1968 | Johnson | |
| 3,638,496 A * | 2/1972 | King .............................. | 73/728 |
| 4,784,148 A * | 11/1988 | Dow et al. ..................... | 600/446 |
| 4,928,031 A | 5/1990 | Linyaev et al. | |
| 5,214,251 A * | 5/1993 | Orban et al. ................... | 181/102 |
| 5,644,186 A * | 7/1997 | Birchak et al. ................. | 310/337 |
| 5,982,708 A * | 11/1999 | Pearce ........................... | 367/157 |
| 6,308,137 B1 | 10/2001 | Underhill et al. | |
| 6,354,146 B1 * | 3/2002 | Birchak et al. ................ | 73/61.79 |
| 7,017,417 B2 * | 3/2006 | Daigle ............................ | 73/705 |
| 7,207,397 B2 * | 4/2007 | Miyamoto et al. ............. | 175/50 |
| 7,364,007 B2 | 4/2008 | Garcia-Osuna et al. | |
| 7,460,435 B2 | 12/2008 | Garcia-Osuna et al. | |
| 7,464,588 B2 * | 12/2008 | Steinsiek ................... | 73/152.55 |
| 2005/0067191 A1 * | 3/2005 | Miyamoto et al. ............. | 175/50 |
| 2005/0172721 A1 * | 8/2005 | Daigle ............................ | 73/705 |
| 2006/0254767 A1 | 11/2006 | Pabon et al. | |
| 2007/0084277 A1 * | 4/2007 | Steinsiek ................... | 73/152.18 |
| 2009/0165547 A1 * | 7/2009 | Steinsiek ................... | 73/152.32 |
| 2009/0173150 A1 * | 7/2009 | DiFoggio et al. .......... | 73/152.19 |
| 2009/0183941 A1 | 7/2009 | Pabon et al. | |

* cited by examiner

*Primary Examiner* — John Fitzgerald
(74) *Attorney, Agent, or Firm* — Jianguang Du; Brigitte Jeffery Echols

(57) ABSTRACT

Methods and related systems are described relating to a sealed acoustic transducer assembly for use in a wellbore is provided. One or more acoustic transducer elements, which can be receivers or transmitters, are housed in an elongated fluid filled sealed container. The sealed container is adapted to be removeably mounted to a portion of a drill collar. The container, which for example can be made of thin corrugated metal or rubber, includes flexible portions along the length of the container which allows for volume changes when exposed to changes in external pressure and/or temperature.

23 Claims, 10 Drawing Sheets

(A-A')

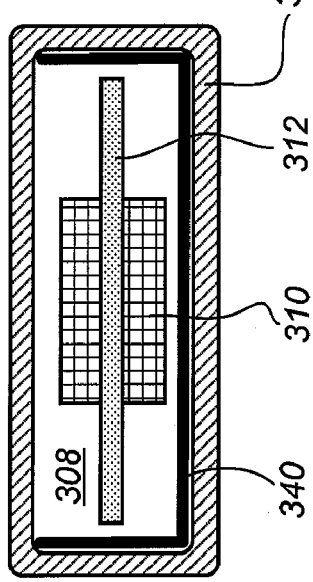
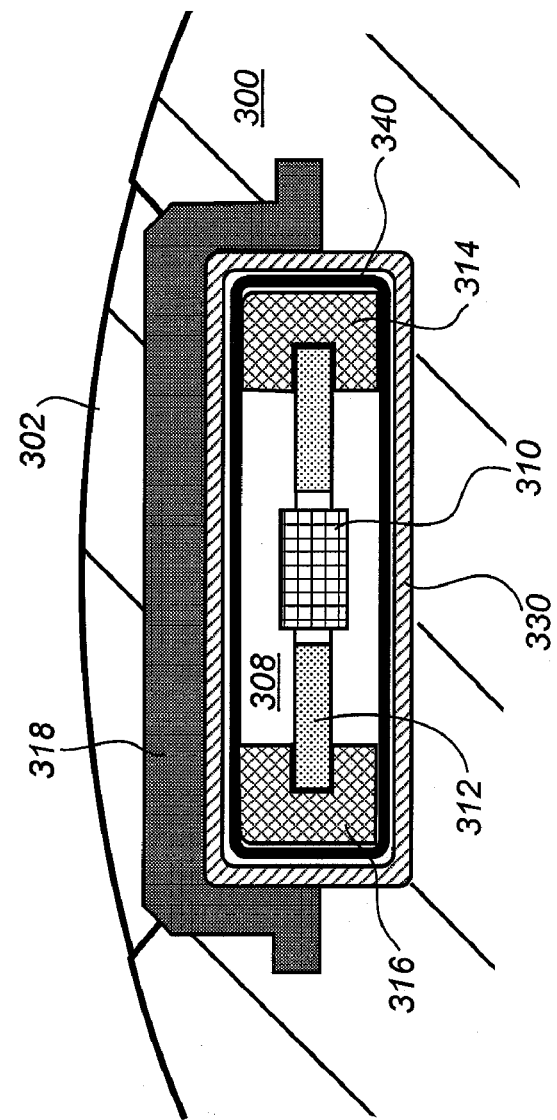

(B-B')

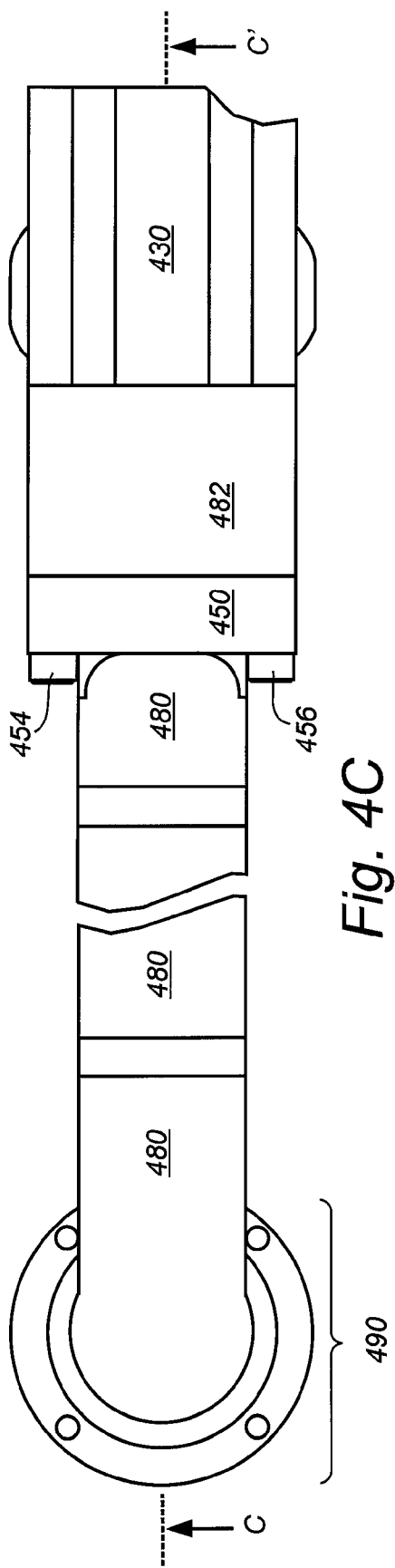
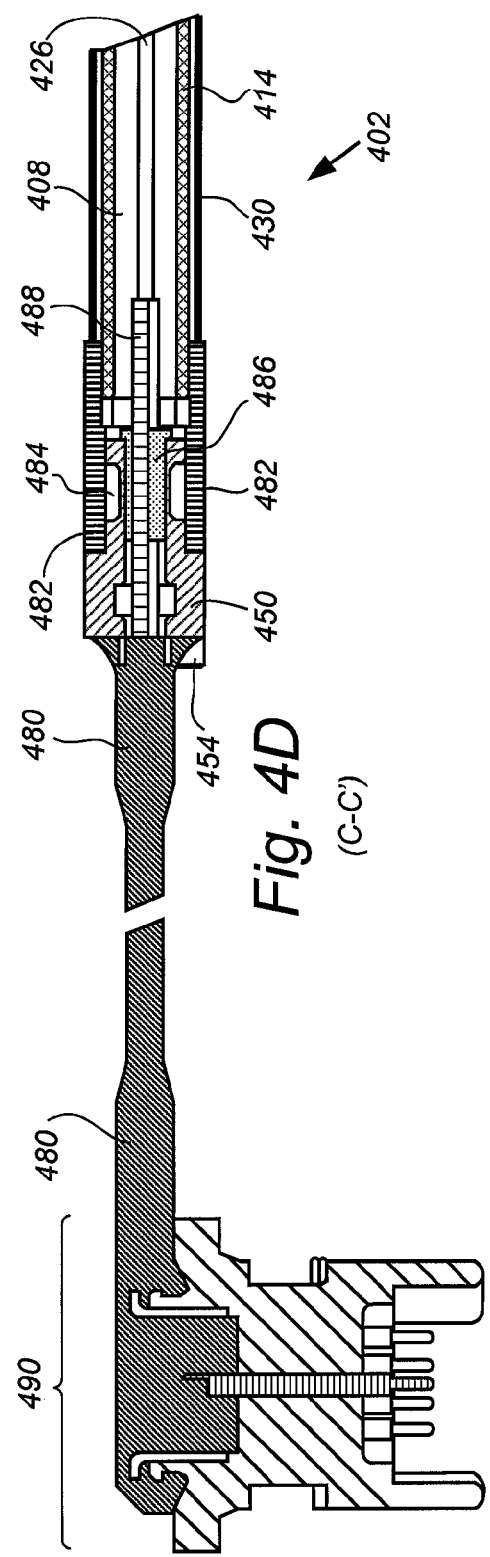

TRANSDUCER ASSEMBLIES FOR DOWNHOLE TOOLS

CROSS-REFERENCE TO RELATED APPLICATIONS

This patent application claims benefit of Provisional Patent Application Ser. No. 61/078,345, filed Jul. 4, 2008, which is incorporated by reference herein.

BACKGROUND OF THE INVENTION

1. Field of the Invention

This patent specification relates to transducer assemblies for use in downhole tools. More particularly, this patent specification relates to sealed acoustic transducer assemblies for use in logging while drilling applications downhole.

2. Background of the Invention

In the oil and gas industry, subsurface formations are typically probed by well logging instruments to determine the formation characteristics. For example sonic tools have been found to provide valuable information regarding subsurface acoustic properties, which may be used to produce images or derive related characteristics for the formations.

For example conventional acoustic tools are equipped with acoustic transducer elements, such as piezoelectric elements. In general such transducer elements have to be isolated from external fluid in downhole environment. However, the transducer elements have difficulty making proper measurements when the pressure of the external fluid is changing, as often is the case in the downhole environment.

Conventional designs of housings for acoustic transducers for use in while drilling applications include sealing the transducer from the external environment using molded rubber that surrounds the transducer. For example, U.S. Pat. No. 7,364,007, which is incorporated herein by reference, discusses transducers and associated electronics modules that are packaged and sealed for exposure to harsh environments, without oil compensation. The sealing material, such as molded rubber, encases the transducer and electronics. Similarly, U.S. Pat. No. 7,460,435, which is incorporated herein by reference, discusses acoustic sources for downhole use that are encased in a liquid-free sealing material, such as molded rubber, for protection.

However, there are number of problems associated with encasing the acoustic transducers and electronics in molded rubber. For example, in some cases it may be difficult to repair a transducer assembly that has suffered an internal component failure. Another potential problem is that manufacturing issues can arise due to high temperatures and/or pressures that may be part of the manufacturing process. Another potential problem is that when positioned downhole, in certain situations there can be problems associated with gas absorbing or otherwise being trapped in the transducer assembly.

Thus, there is a need of transducer assemblies that alleviate some or all of the foregoing problems with conventional designs for downhole transducer assemblies.

SUMMARY OF THE INVENTION

According to embodiments, a sealed acoustic transducer assembly for use in a wellbore is provided. The system includes an acoustic transducer element; and an elongated fluid filled sealed container housing the transducer element and adapted to be removeably mounted to a portion of a drill collar. The container includes flexible portions along the length of the container which allows for volume changes when exposed to changes in external pressure and/or temperature.

The assembly preferably includes a rubber shock absorbing member between the transducer element and the container housing such that the assembly is suitable for operation downhole during a wellbore drilling operation.

The assembly preferably also includes a number of other transducer elements housed in the sealed container, and the sealed container housing preferably has substantially the same cross section near each transducer element and in-between each two transducer elements.

The acoustic transducer elements can be acoustic receivers, and the assembly can further include electronics housed within the sealed container housing adapted to receive and process electrical signals generated by the acoustic receivers.

The container housing can be primarily made of metal, with the flexible portions being flexible due to the thickness of the metal as well as one or more corrugations in the metal along the length of the container.

Alternatively, the container housing can be primarily made of rubber, with the rubber housing being removable to allow repair and/or replacement of the transducer element or other components housed within the container.

Further features and advantages of the invention will become more readily apparent from the following detailed description when taken in conjunction with the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 3A-E show views of a transducer assembly according to some embodiments of the invention;

FIGS. 4A-E show views of a transducer assembly according to some further embodiments of the invention.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicated like elements.

Figure 1:
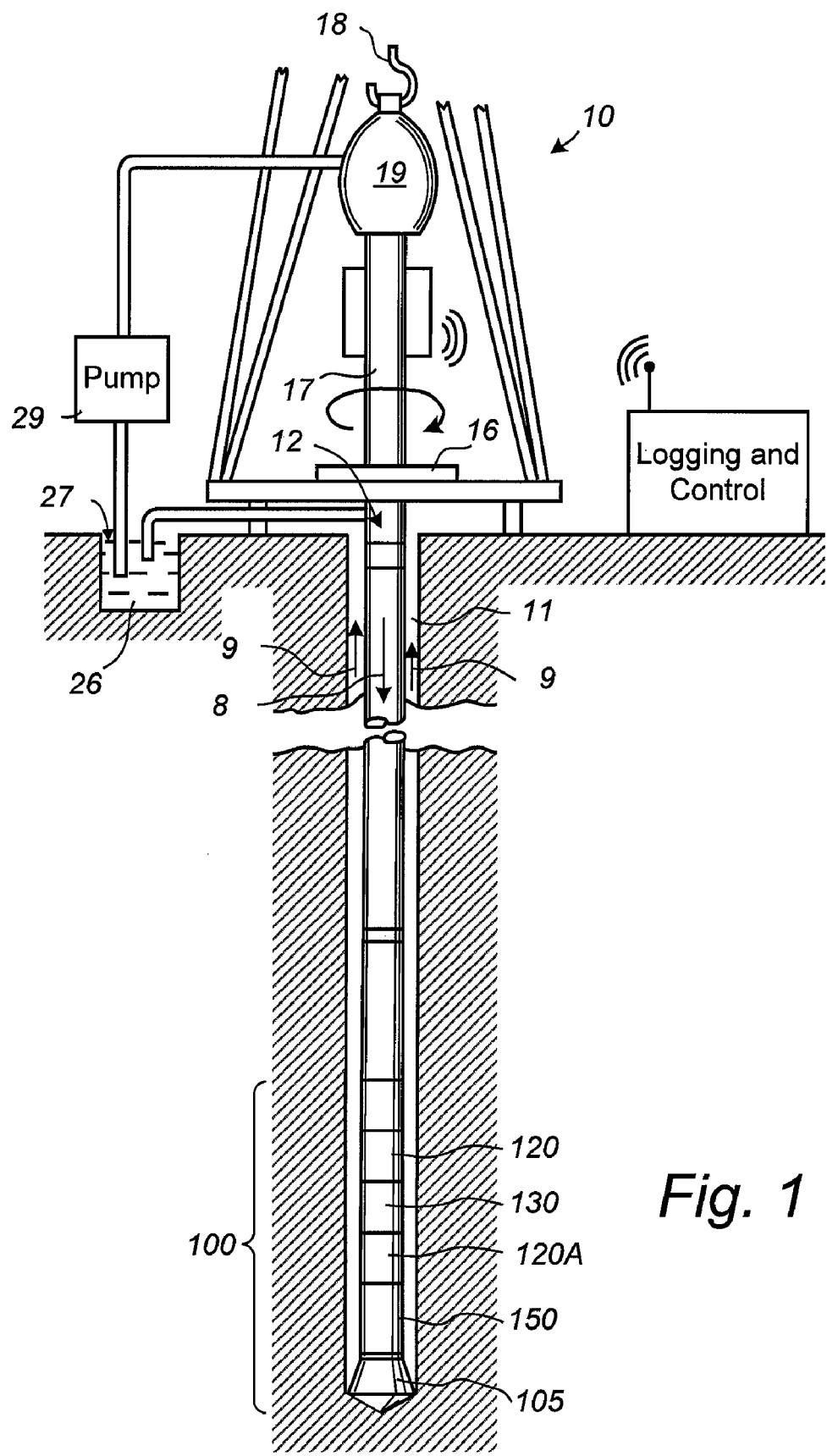
FIG. 1 illustrates a wellsite system in which the present invention can be employed.

FIG. 1 illustrates a wellsite system in which the present invention can be employed. The wellsite can be onshore or offshore. In this exemplary system, a borehole 11 is formed in subsurface formations by rotary drilling in a manner that is well known. Embodiments of the invention can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a sonic measuring device. According to some embodiments, LWD module 120 includes one or more acoustic transducer assemblies such as shown in and described with respect to FIGS. 3A-E, 4A-E, and 5A-B.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

Figure 2:
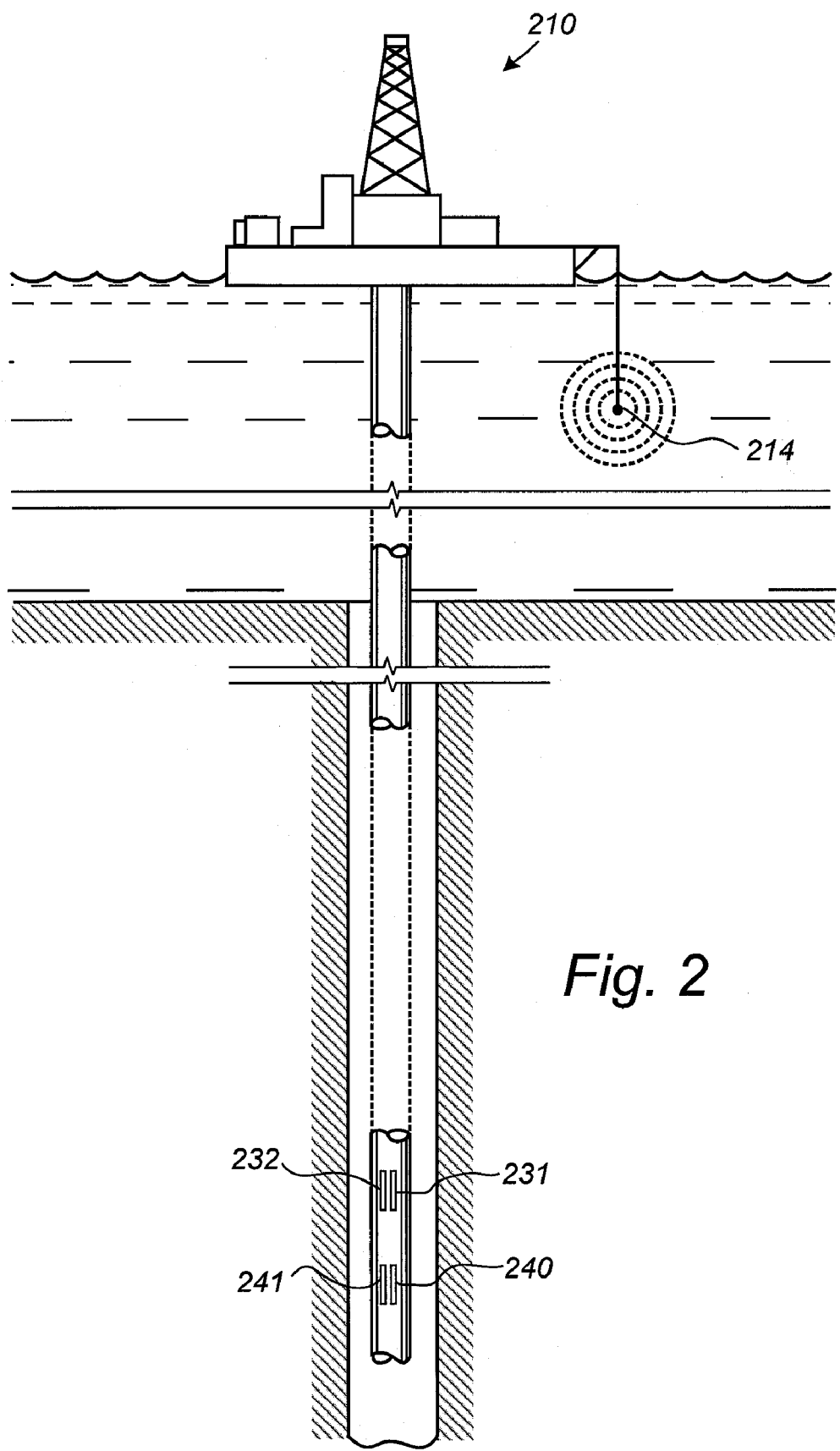
FIG. 2 illustrates a sonic logging-while-drilling tool on which the present invention can be employed.

FIG. 2 illustrates a sonic logging-while-drilling tool which can be the LWD tool 120, or can be a part of an LWD tool suite 120A of the type described in U.S. Pat. No. 6,308,137, incorporated herein by reference. In a disclosed embodiment, as shown in FIG. 2, an offshore rig 210 is employed, and a sonic transmitting source or array 214 is deployed near the surface of the water. Alternatively, any other suitable type of uphole or downhole source or transmitter can be provided. An uphole processor controls the firing of the transmitter 214. The uphole equipment can also include acoustic receivers and a recorder for capturing reference signals near the source. The uphole equipment further includes telemetry equipment for receiving MWD signals from the downhole equipment. The telemetry equipment and the recorder are typically coupled to a processor so that recordings may be synchronized using uphole and downhole clocks. The downhole LWD module 200 includes circumferentially spaced at least acoustic receivers 231 and 232, which are coupled to a signal processor so that recordings may be made of signals detected by the receivers in synchronization with the firing of the signal source. Separate acoustic transmitters 240, 241 can be provided and spaced circumferentially. According to some embodiments, receivers 231 and 232 are the acoustic transducer assemblies such as shown in and described with respect to FIGS. 3A-E, 4A-E. According to some embodiments, transmitters 240, 241 are the acoustic transducer assembly such as shown in and described with respect to FIGS. 5A-B.

Figure 3A:
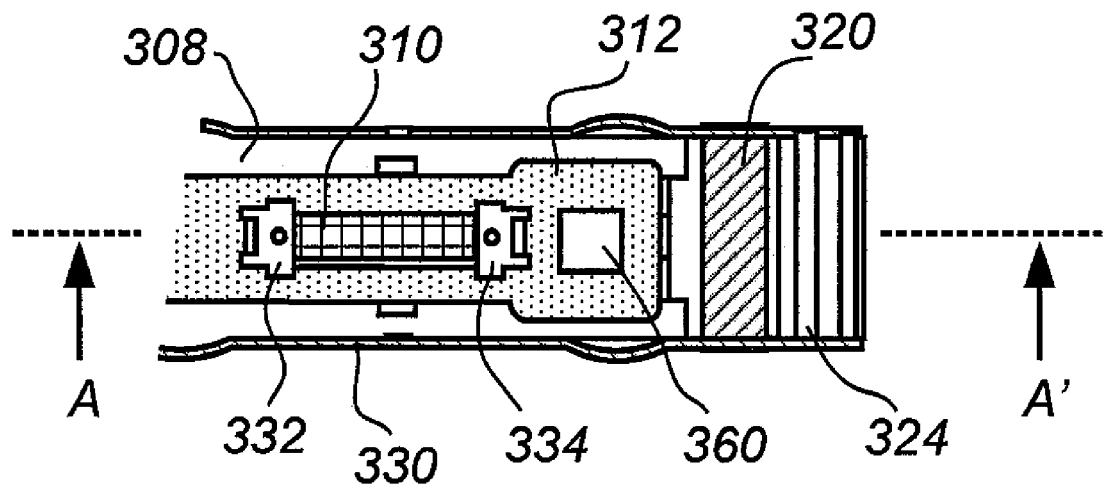

FIGS. 3A-E show views of a transducer assembly according to some embodiments of the invention. FIG. 3A shows a cross section of a portion of a transducer assembly according to some embodiments. Transducer element 310 is mounted on printed circuit board 312 using two fasteners 332 and 334. Also mounted on printed circuit board 312 are electronics 360. According to some embodiments, the transducer 310 is used primarily as an acoustic receiver, and electronics 360 include analog and digital circuitry used in measuring, recording, processing and/or transmitting acoustic energy detected by transducer 310. The transducer element 310 may consist of piezoelectric devices, lead titanate devices, lead zirconatetitanate devices, 1-3 piezocomposite type devices, or any other suitable materials known in the art. The transducer elements detect acoustic energy outside of the assembly with high fidelity.

Figure 3B:
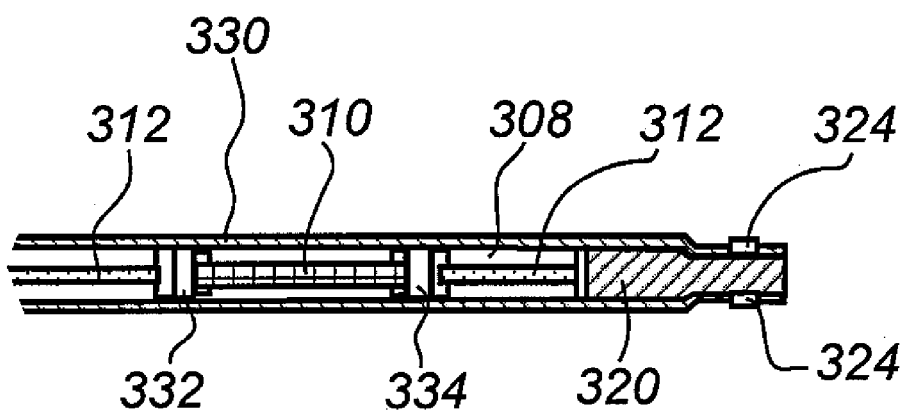

Transducer element 310, electronics 360 and printed circuit board 312 are housed in a flexible housing 330 which according to some embodiments is a rubber tube of 0.5 mm to a few millimeters thickness. It has been found that approximately 1 mm thickness is suitable for some applications. Other suitable materials which are substantially acoustically transparent include thin metal and/or plastic. Flexible housing 330 should also be able to expand or contract according to the changes in volume of its contents. The housing 330 is a continuous tube shape which is sealed at both ends with end caps. As shown in FIG. 3A, end cap 320 is used to seal one end of housing 330. Thus, a sealed container is formed by the housing 330 and the end caps. The sealed container houses the various components but also includes one or more cavities 308 which are preferably filed with silicone oil. According to other embodiments, another electrically isolative fluid such as liquid and/or gel is used to occupy the cavities 308. The flexible housing 330 is sealed to the end cap 320 using a clamp 324. FIG. 3B is a cross section along the line A-A' in FIG. 3A.

FIG. 3C shows a simplified cross section of a transducer assembly according to some embodiments of the invention. Transducer element 310 is mounted to printed circuit board 312 with fasteners (not shown). Cavity 308 contains compensating oil, as has been previously described. A metal frame 340 is used to house and provide strength to the transducer assembly. Metal frame 340 can partially or fully surround the transducer element, printed circuit board and electronics (not shown). According to some embodiments, metal frame 340 contains openings to facilitate repair and/or replacement of various components in the assembly. Flexible housing, which can be a rubber tube, is also shown in FIG. 3C.

FIG. 3C shows a simplified cross section of a transducer assembly according to some embodiments of the invention. Transducer element 310 is mounted to printed circuit board 312 with fasteners (not shown). Cavity 308 contains compensating oil, as has been previously described. A metal frame 340 is used to house and provide strength to the transducer assembly. Metal frame 340 can partially or fully surround the transducer element, printed circuit board and electronics (not shown). According to some embodiments, Meal frame 340 is contains openings to as to facilitate repair and/or replacement of various components in the assembly. Flexible housing, which can be a rubber tube, is also shown in FIG. 3C.

FIG. 3D shows a cross section of a transducer assembly in a sealed container mounted within a portion of drill collar. Transducer element 310 is mounted to printed circuit board 312 with fasteners (not shown). Cavity 308 contains compensating oil, as has been previously described. Rubber holders 314 and 316 are located on either side of the printed circuit board 312 and maintain the position of the printed circuit board 312 within metal frame 340 which houses the transducer assembly. The metal frame 340 is surrounded by flexible housing 330. The assembly is positioned in and is easily removable from a notch of drill collar 300 as shown. Sliding shield 318 further protects the transducer assembly from mechanical damage during deployment downhole. The end wall 302 of the groove in the drillcollar 300 is also shown.

Note that although only one transducer element is shown in FIGS. 3A-D there are a plurality of transducer elements spaced longitudinally along the transducer assembly, all of which are housed within the sealed container. According to some embodiments, four, eight or twelve transducer elements are mounted to one, two or three printed circuit boards, all housed within the sealed container housing. According to embodiments, the shape of the sealed container of the transducer assembly, is substantially constant at least between the first transducer and the last transducer in the container.

Figure 3E:
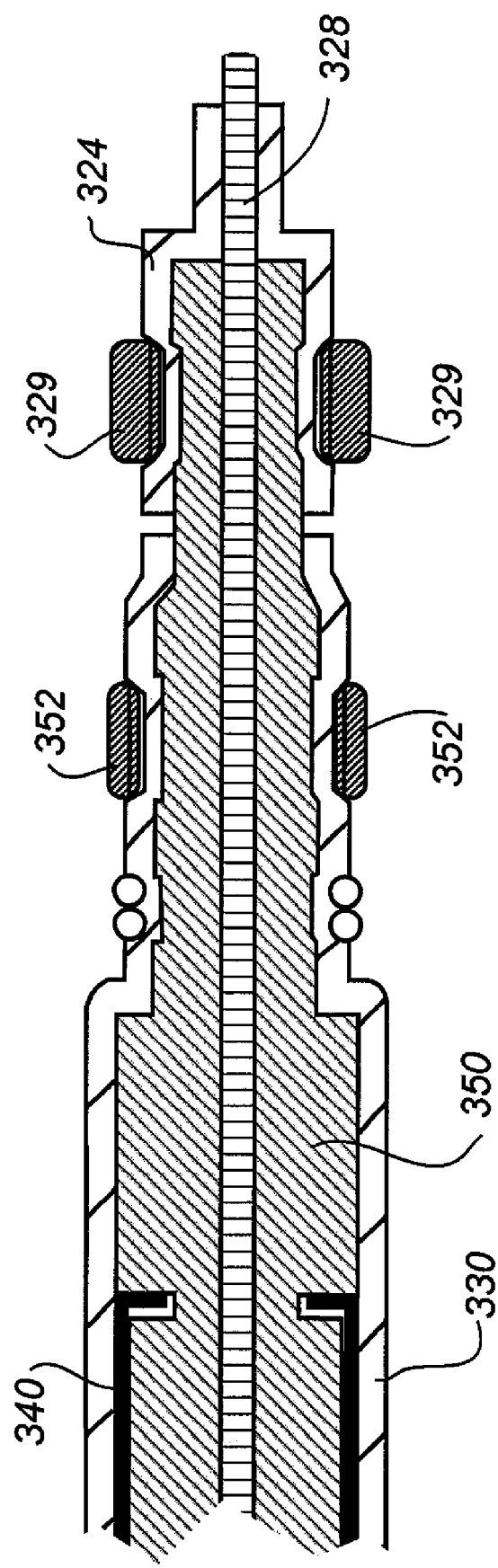

FIG. 3E shows a cross section of an end cap of a sealed transducer assembly container, according to embodiments. Note that the end cap 350 shown in FIG. 3E is at the opposite end of the flexible housing as end cap 320 shown in FIGS. 3A-B. Notably, end cap 350 includes a central opening for conducting wires 328 to pass through. Metal frame 340 fits in to the notches of end cap 350 as shown. Flexible housing 330 is sealed to the end cap 350 using clamp 352. Additionally a rubber boot 324 is provided that is clamped to the end of end cap 350 using clamp 329. Rubber boot 324 prevents mud and oil from leaking through the boundary between end cap 350 and conducting wires 328. For further information and details on enclosures for use downhole for acoustic transducers, see, U.S. Patent Application Publication No. 2006/0254767, and U.S. patent application Ser. No. 12/392,424 filed on Feb. 25, 2009, both of which are incorporated by reference herein.

Thus, the sealed housing as shown and described with respect to FIGS. 3A-E is able to be opened and re-sealed via the unclamping of the end caps, thereby facilitating diagnostics, repair and/or replacement of any components housed therein. Additionally, since the flexible housing is not molded in place as with some conventional designs, problems associated with exposing the electronic components to high pressures and/or temperatures during the rubber molding process can be eliminated.

Figure 4A:
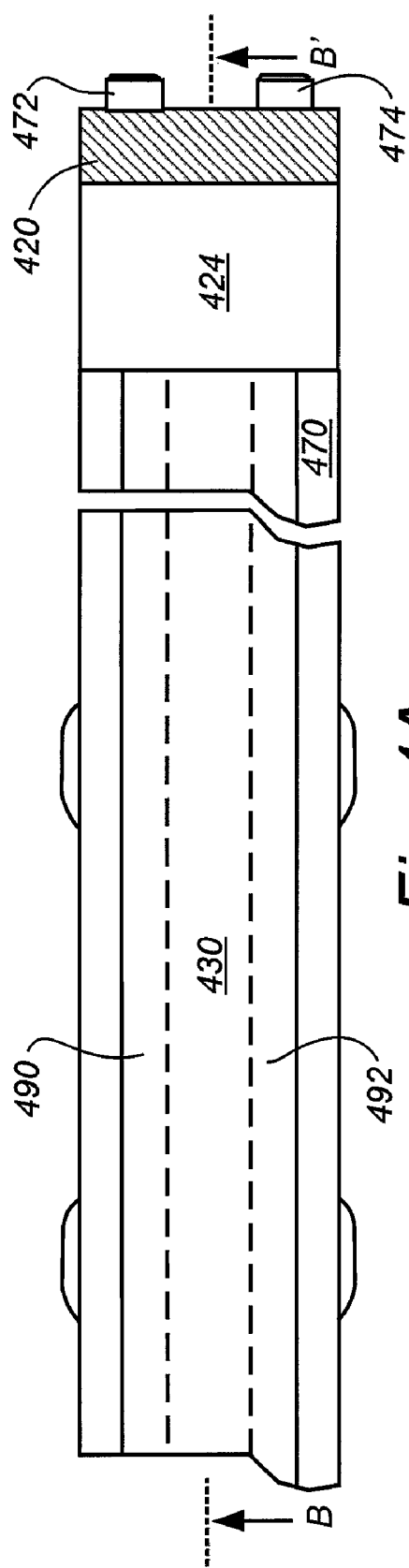

FIGS. 4A-E show views of a transducer assembly according to some further embodiments of the invention. FIG. 4A shows a top view of a portion of a transducer assembly according to some embodiments. Transducer assembly 402 is housed in a sealed container that includes corrugated metal frame 430 with flanges and endcaps on both ends. Shown in FIG. 4A is flange 424 and end cap 420. End cap 420 includes two bolts 472 and 474 that are used for attaching and fixing the end cap 420 and flange 424 under vibration shock and differential pressure. In order to fill the container with oil or other compensating fluid, the end cap 420 is removed. Metal frame 430 should be able to expand or contract according to the changes in volume of its contents. For many applications the thickness of the metal frame 430 is less than 1 mm. It has been found that about 0.3 mm thickness is preferable for some applications. The frame 430 is also a continuous corrugated shape. Note that the corrugations such as corrugations 490 and 492, and the thickness of the metal, allow for this flexibility while maintaining strength in the frame. Holder 470 holds the metal frame 430 from the sides and bottom and provides both alignment and shock protection for the transducer assembly. According to some embodiments, holder 470 is made of rubber.

Figure 4B:
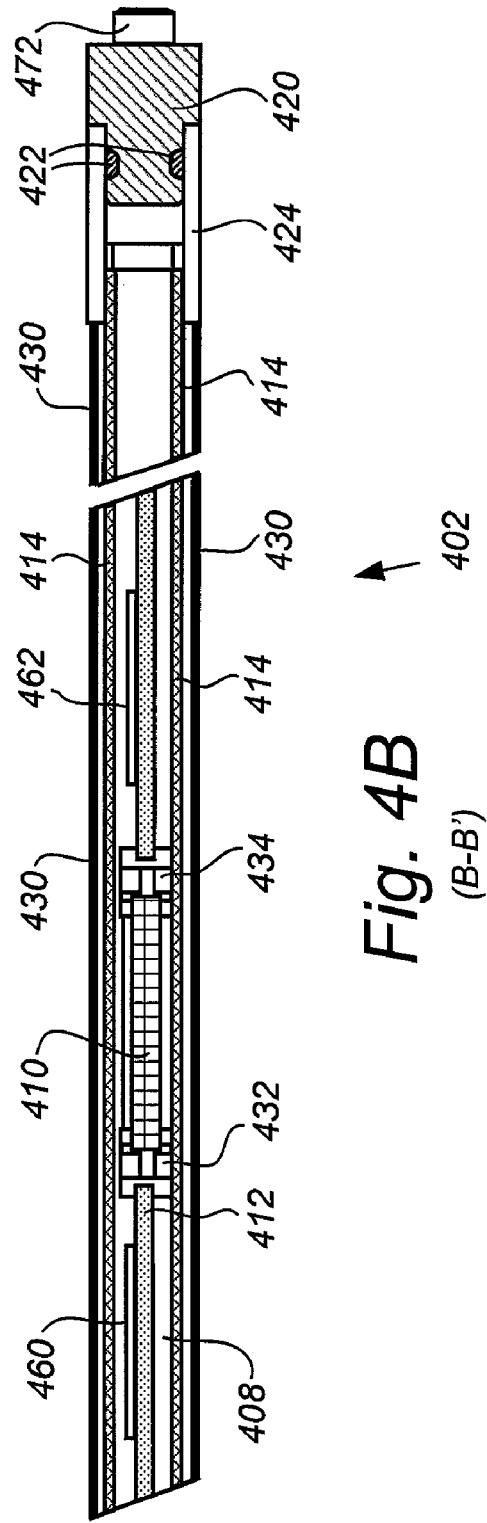

FIG. 4B is a cross section of transducer assembly 402 along the line B-B'. Transducer element 410 is mounted on printed circuit board 412 using two fasteners 432 and 434. Also mounted on printed circuit board 412 are electronics 460 and 462. According to some embodiments, the transducer 410 is used primarily as an acoustic receiver, and electronics 460 and 462 include analog and digital circuitry used in measuring, recording, processing and/or transmitting acoustic energy detected by transducer 410 and other transducers within transducer assembly 402. The transducer element 410 may consist of piezoelectric devices, lead titanate devices, lead zirconatetitanate devices, 1-3 piezocomposite type devices, or any other suitable materials known in the art. The transducer elements detect acoustic energy outside of the assembly with high fidelity. The printed circuit board 412 is held by an inner rubber holder 414 which slides into metal frame 430. The metal frame 430 is sealed at this end with Flange 424 end cap 420 and o-ring 422. The sealed container houses the various components but also includes one or more cavities 408 which are preferably filed with silicone oil. According to other embodiments, another electrically isolative fluid such as gas, liquid and/or gel is used to occupy the cavities 408.

FIG. 4C shows a top view of another portion of the transducer assembly 402 shown and described with respect to FIGS. 4A-B. Metal frame 430 is sealed at the end shown with flange 482 and end cap 450. Bolts 454 and 456 are used to fix end cap 450 and Flange 482. A rubber molding 480 houses conductive cables which pass between the transducer assembly 402 and rubber molded 9-pin bulkhead 490. FIG. 4D is a cross section of transducer assembly 402 along the line C-C'. Conductive cable 426 provides electrical contacts between the circuit board 412 (not shown) and metal socket contact pins 488 and the cable within rubber molding 480. Inner rubber holder 414 is shown housed within metal frame 430. The metal frame is sealed at this end with flange 482 and end cap 450 and o-ring 484. Also included on this end is a PEEK insulator 486.

Figure 4E:
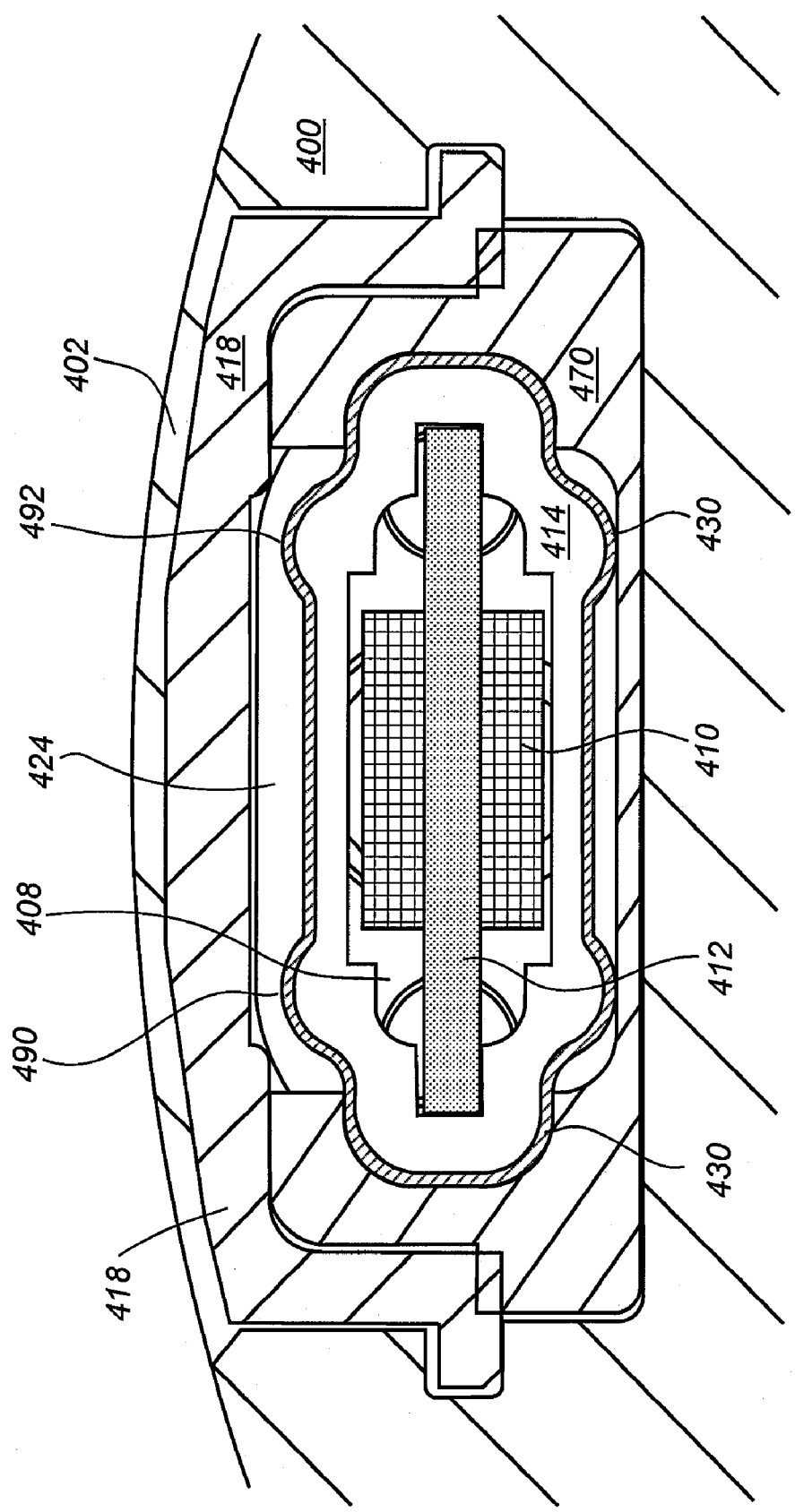

FIG. 4E shows a cross section of the transducer assembly of FIGS. 4A-D mounted within a portion of drill collar. Transducer element 410 is mounted to printed circuit board 412 with fasteners (not shown). Cavity 408 contains compensating oil, as has been previously described. Inner rubber holder 414 holds the printed circuit board 412 and maintains the position of the printed circuit board 412 within metal frame 430 which houses the transducer assembly. The cross section shown in FIG. 4E shows the corrugations in the metal frame, including corrugations 490 and 492. The assembly is positioned in and is easily removable from a notch of drill collar 400 as shown. Sliding shield 418 further protects the transducer assembly from mechanical damage during deployment downhole. Holder 470 provides alignment and shock protection for the metal frame 430. The end wall 402 of the groove in the drill collar 400 is also shown.

Note that although only one transducer element is shown in FIGS. 4A-E there are a plurality of transducer elements spaced longitudinally along the transducer assembly, all of which are housed within the sealed container. According to some embodiments, four, eight or twelve transducer elements are mounted to one, two or three printed circuit boards, all housed within the sealed container housing. According to embodiments, the shape of the sealed container of the transducer assembly, is substantially constant at least between the first transducer and the last transducer in the container.

Thus, the sealed housing as shown and described with respect to FIGS. 4A-E is able to be opened and re-sealed via the unclamping of the end caps, and sliding the inner rubber holder and printed circuit board from the metal frame, thereby facilitating diagnostics, repair and/or replacement of any components housed therein. Since the flexible housing is not molded in place as with some conventional designs, problems associated with exposing the electronic components to high pressures and/or temperatures during the rubber molding process can be eliminated. Additionally, since the housing is made of metal, problems associated with gas absorption while deployed in the downhole environment are alleviated or eliminated.

Figure 5A:
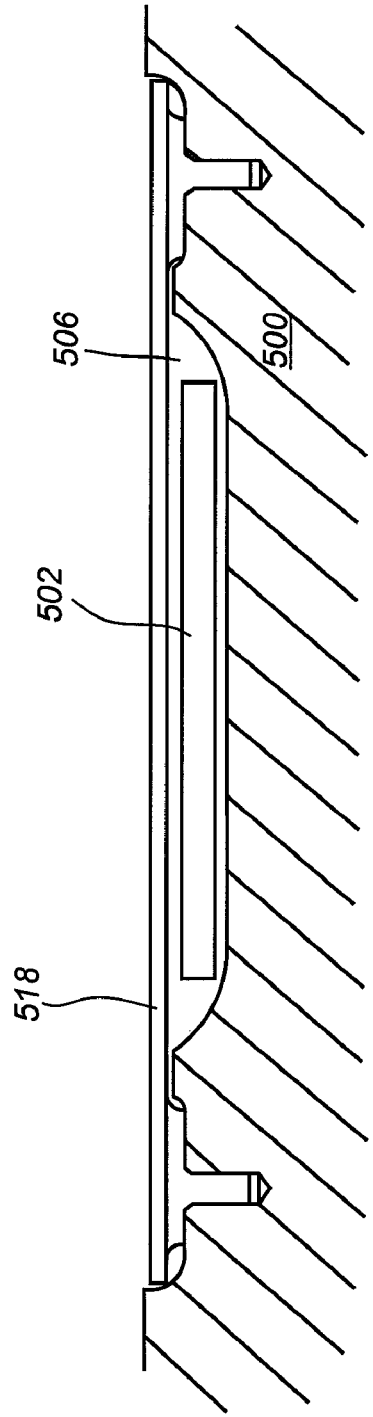
FIGS. 5A-B are cross sections of an acoustic transmitter assembly mounted in a portion or drill collar, according to embodiments.
Figure 5B:
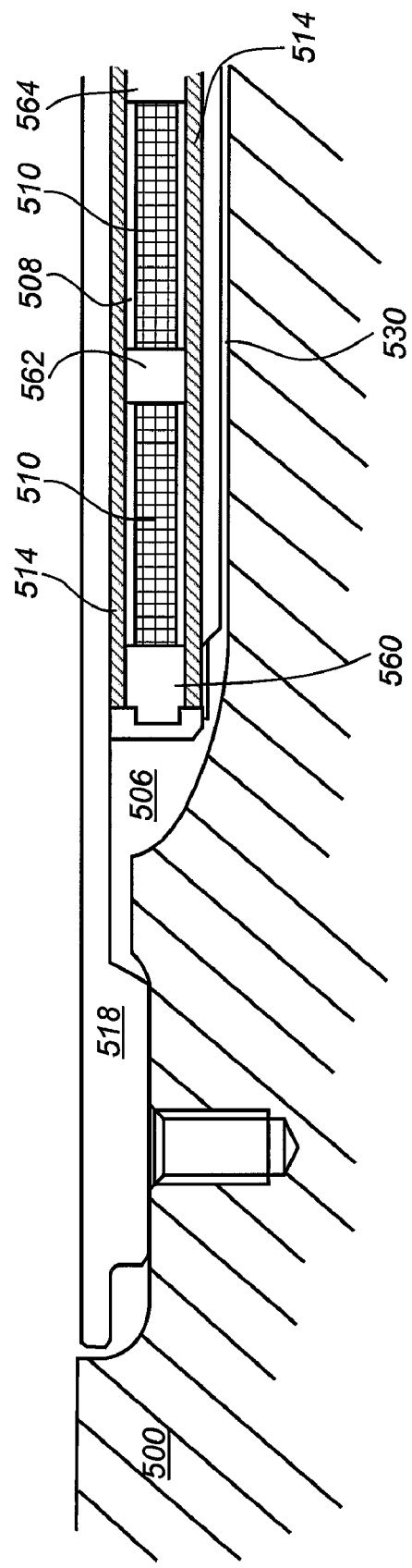

FIGS. 5A-B are cross sections of an acoustic transmitter assembly mounted in a portion or drill collar, according to embodiments. In FIG. 5A, transmitter housing assembly 502 is mounted in a notch 506 in portion of drill collar 500. The Transmitter housing assembly 502 is covered by a transmitter metal shield 518. FIG. 5B shows further detail of the transmitter assembly 502. The transducer element 510 may consist of piezoelectric devices, lead titanate devices, lead zirconatetitanate devices, 1-3 piezocomposite type devices, or any other suitable materials known in the art. Acoustic energy generated with the transducer elements is emitted to outside of the assembly with minimum loss of energy. Transducer element 510 is held by a number of frame elements 560, 562 and 564. According to some embodiments, the frame elements 560, 562 and 564 are made from PEEK structure, and according to other embodiments, the frame elements 560, 562 and 564 are made from fiber reinforced plastic (FRP). The transducer and frame elements are then enclosed in an insulation sheet 514, which according to some embodiments is made from PTFE. According to other embodiments, the insulation sheet 514 is made from thin rubber. Depending on the design, the sheet 514 may or may not fully enclose the transducer and frame elements. The transducer element 510 and frame elements are mounted, according to some embodiments, using epoxy. Surrounding the assembly is a corrugated metal canister 530, which together with two end caps forms a sealed container when mounted to the metal transmitter shield 518. According to some embodiments, the end caps are welded to the transmitter shield 518. The transducer assembly is easily removed from the drill collar 500 by unmounting the transmitter shield 518 from the drill collar body 500. Note that in FIG. 5B, only one end cap 550 is shown but there is another end cap for the opposite end of the transmitter assembly 502. The inner cavities 508 are filled with a compensating fluid such as silicone oil. According to other embodiments, another fluid such as liquid and/or gel is used to occupy the cavities 508. As in the previously described embodiments of FIGS. 4A-E, the corrugated metal container allows for expansion and contraction according to the changes in volume of its contents when exposed to external pressure changes. Also not shown in FIG. 5B are the electrical connections and a four-pin bulkhead, which are provided in a similar way as that shown in the embodiment of FIGS. 4A-E.

Figure 6:
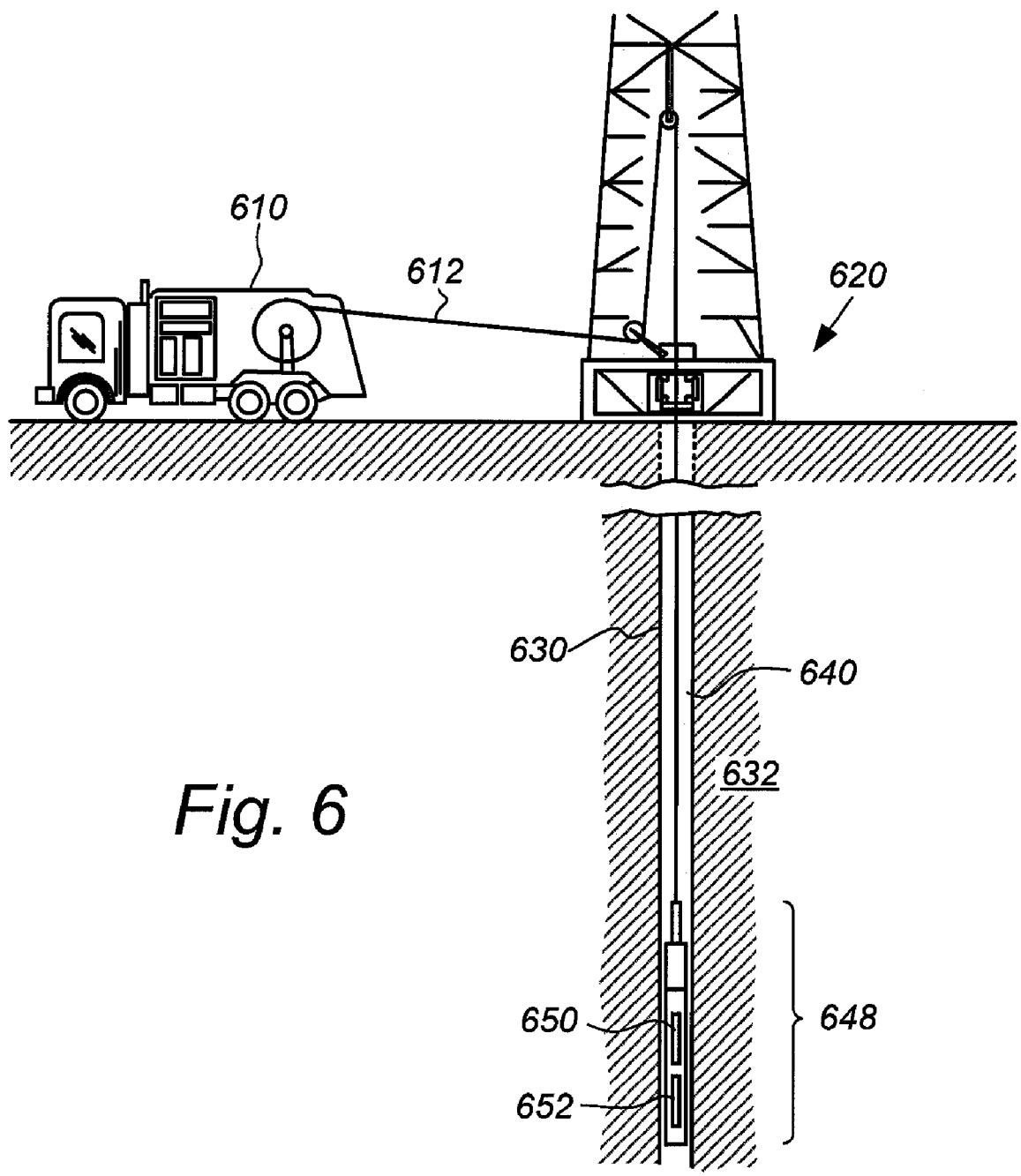
FIG. 6 illustrates transducer assemblies which are deployed using a wireline tool.

FIG. 6 shows transducer assemblies being deployed using a wireline tool, according to some embodiments. Wireline tool 648 is being deployed in a wellbore 640 having a casing or borehole wall 630 and being formed in subterranean rock formation 632. Wireline tool 648 is suspended from wireline cable 612 which provides control from and communication with wireline truck 610. Tool 648 includes two or more transducer assemblies 650 and 652 to make acoustic measurements in rock formation 632. For example, assembly 652 could correspond to a transmitter assembly as shown and described with respect to FIGS. 5A-B, and assembly 650 could correspond to a receiver assembly as shown and described with respect to FIGS. 3A-E or FIGS. 4A-E. Additionally, according to some embodiments tool 648 could include greater or fewer numbers of transducer assemblies.

As explained above, according to embodiments of the present invention, since the container is adapted to be removeably mounted, it is possible to facilitate diagnostics, repair and/or replacement of any components housed therein, for example. Additionally, because the flexible housing would not be molded in place, problems associated with exposing the electronic components to high pressures and/or temperatures during the rubber molding process can be eliminated.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Further, the invention has been described with reference to particular preferred embodiments, but variations within the spirit and scope of the invention will occur to those skilled in the art. It is noted that the foregoing examples have been provided merely for the purpose of explanation and are in no way to be construed as limiting of the present invention. While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A sealed acoustic transducer assembly for use in a wellbore comprising:
    an acoustic transducer element; and
    an elongated fluid filled sealed container housing the transducer element and adapted to be removeably mounted to a portion of a drill collar,
    the container housing including:
        flexible portions along the length of the container housing allowing for volume changes when exposed to changes in external pressure and/or temperature, a tubular member having two open ends, two end caps closing the two open ends, and two rubber boots adapted to be clamped to the two end caps so as to seal the open ends.

2. The transducer assembly according to claim 1, wherein the container housing is filled with a non-conductive fluid.

3. The transducer assembly according to claim 1, wherein the acoustic transducer element is an acoustic transmitter, wherein a shield plate is fixed to the portion of the drill collar, and wherein the sealed container housing includes a metal housing mounted to the shield plate.

4. The transducer assembly according to claim 1, wherein the container housing is primarily made of metal, and wherein the flexible portions are flexible due to the thickness of the metal as well as one or more corrugations in the metal along the length of the container housing.

5. The transducer assembly according to claim 1, wherein the container housing is primarily made of an elastic material, and the container housing is removable to allow repair and/or replacement of the transducer element or other components housed within the container housing.

6. The transducer assembly according to claim 1, wherein the flexible portions of the container housing make up the majority of surface area of the container housing.

7. The transducer assembly according to claim 6, wherein the flexible portions make up more than 90 percent of the surface area of the container housing.

8. The transducer assembly according to claim 1, wherein the assembly further includes shock protection such that the assembly is suitable for operation downhole during a wellbore drilling operation.

9. The transducer assembly according to claim 8, wherein the shock protection includes a rubber shock absorbing member between the transducer element and the container housing.

10. The transducer assembly according to claim 1, further comprising second and third acoustic transducer elements housed in the sealed container housing, wherein the transducer elements are spaced apart from each other.

11. The transducer assembly according to claim 10, wherein the sealed container housing has substantially the same cross section in the longitudinal direction near each transducer element and in-between any two transducer elements.

12. The transducer assembly according to claim 10, wherein the acoustic transducer elements are acoustic receivers, and wherein the sealed container housing further comprises electronics therein to adapt to receive and process electrical signals generated by the acoustic receivers.

13. A sealed acoustic transducer assembly for use in a wellbore comprising:

a plurality of acoustic transducer elements; and an elongated fluid filled sealed container housing the transducer elements and adapted to be removeably mounted to a portion of a drill collar, wherein the container housing includes flexible portions along the length of the container housing allowing for volume changes when exposed to changes in external pressure and/or temperature, and wherein the sealed container housing has substantially the same cross section in the longitudinal direction near each of the transducer elements and in-between any two transducer elements.

14. The transducer assembly according to claim 13, wherein the container housing is filled with a non-conductive fluid.

15. The transducer assembly according to claim 13, wherein the acoustic transducer elements are acoustic transmitters, wherein a shield plate is fixed to the portion of the drill collar, and wherein the sealed container housing includes a metal housing mounted to the shield plate.

16. The transducer assembly according to claim 13, wherein the container housing is primarily made of metal, and wherein the flexible portions are flexible due to the thickness of the metal as well as one or more corrugations in the metal along the length of the container housing.

17. The transducer assembly according to claim 13, wherein the transducer elements are spaced apart from each other.

18. The transducer assembly according to claim 17, wherein the acoustic transducer elements are acoustic receivers, and wherein the sealed container housing further comprises electronics therein to adapt to receive and process electrical signals generated by the acoustic receivers.

19. The transducer assembly according to claim 13, wherein the flexible portions of the container housing make up the majority of surface area of the container housing.

20. The transducer assembly according to claim 19, wherein the flexible portions make up more than 90 percent of the surface area of the container housing.

21. The transducer assembly according to claim 13, wherein the assembly further includes shock protection such that the assembly is suitable for operation downhole during a wellbore drilling operation.

22. The transducer assembly according to claim 21, wherein the shock protection includes a rubber shock absorbing member between the transducer elements and the container housing.

23. A sealed acoustic transducer assembly for use in a wellbore comprising:

an acoustic transducer element; and an elongated fluid filled sealed container housing the transducer element and adapted to be removeably mounted to a portion of a drill collar, wherein the container housing itself is flexible along the length of the container housing so as to allow for volume changes when exposed to changes in external pressure and/or temperature.

* * * * *